(12) United States Patent
Seidel et al.

(10) Patent No.: US 9,242,293 B2
(45) Date of Patent: Jan. 26, 2016

(54) METHOD AND PLANT FOR PRODUCING A METAL STRIP

(71) Applicant: SMS Siemag AG, Duesseldorf (DE)

(72) Inventors: Juergen Seidel, Kreuztal (DE); Peter Sudau, Hilchenbach (DE)

(73) Assignee: SMS GROUP GMBH, Duesseldorf (DE)

( * ) Notice: Subject to any disclaimer, the term of this patent is extended or adjusted under 35 U.S.C. 154(b) by 0 days.

(21) Appl. No.: 14/374,266

(22) PCT Filed: Jan. 25, 2013

(86) PCT No.: PCT/EP2013/051433
§ 371 (c)(1),
(2) Date: Jul. 24, 2014

(87) PCT Pub. No.: WO2013/110754
PCT Pub. Date: Aug. 1, 2013

(65) Prior Publication Data
US 2015/0034268 A1    Feb. 5, 2015

(30) Foreign Application Priority Data

Jan. 25, 2012 (DE) .......................... 10 2012 201 090

(51) Int. Cl.
*B22D 11/16* (2006.01)
*B22D 11/14* (2006.01)
(Continued)

(52) U.S. Cl.
CPC .............. *B22D 11/141* (2013.01); *B21B 1/466* (2013.01); *B21B 45/004* (2013.01);
(Continued)

(58) Field of Classification Search
CPC .............. B22D 11/16; B22D 11/1284; B22D 11/1287; B22D 11/141; B21B 1/466; B21B 37/74; B21B 45/004; B21B 45/008
See application file for complete search history.

(56) References Cited

U.S. PATENT DOCUMENTS

| 4,182,146 A | 1/1980 | Sevenich |
| 4,918,960 A | 4/1990 | Lipukhin |

(Continued)

FOREIGN PATENT DOCUMENTS

| DE | 10 2008 029 581 | 1/2009 |
| DE | 10 2008 055 650 | 5/2010 |
| DE | 10 2006 054 932 | 9/2011 |
| EP | 183 209 | 6/1986 |
| EP | 1 375 680 | 1/2004 |
| WO | 85 03891 | 9/1985 |

(Continued)

*Primary Examiner* — Kevin P Kerns
*Assistant Examiner* — Steven Ha
(74) *Attorney, Agent, or Firm* — Abelman, Frayne & Schwab (57) ABSTRACT

The invention relates to a method of producing a metal strip (1) in a plant, comprising a continuous casting plant (2), a first furnace (3), a second furnace (4) and an adjoining rolling mill (5). In order to save energy, the method provides in accordance with the invention the steps of: a) establishing a scope of production, which is effected, of metal slabs or metal strips (1), comprising at least two different metal slabs or metal strips (1); b) determining the respective entry temperature ($T_{FM}$) into the rolling mill (5) for all metal slabs or metal strips (1) to be produced; c) determining an exit temperature ($T_{AO1}$) from the first furnace (3), wherein this is selected to be smaller than the highest entry temperature ($T_{FM}$), which is determined in step b), into the rolling mill (5) and smaller than or substantially the same as the lowest entry temperature ($T_{FM}$, which is determined in step b), into the rolling mill (5); d) operating the first furnace (3) in such a manner that the metal slabs or metal strips (1) to be produced leave the first furnace (3) with the exit temperature ($T_{AO1}$) determined in accordance with step c); e) heating or reheating a metal slab, which is to be produced, or a metal strip (1), which is to be produced, by means of the second furnace (4) to its requisite entry temperature ($T_{FM}$) in the rolling mill (5) insofar as this temperature lies above the exit temperature ($T_{AO1}$), which was determined in accordance with step (d), of the first furnace (3). In addition, the invention relates to a plant for producing a metal slab or a metal strip.

17 Claims, 10 Drawing Sheets

(51) Int. Cl.
*B21B 1/46* (2006.01)
*B21B 45/00* (2006.01)
*B22D 11/128* (2006.01)
*B21B 37/74* (2006.01)

(52) U.S. Cl.
CPC ....... *B22D 11/1284* (2013.01); *B22D 11/1287* (2013.01); *B22D 11/16* (2013.01); *B21B 37/74* (2013.01); *B21B 45/008* (2013.01); *Y02P 70/127* (2015.11)

(56) References Cited

U.S. PATENT DOCUMENTS

| | | | |
|---|---|---|---|
| 5,307,864 | A | 5/1994 | Arvedi |
| 7,942,191 | B2 | 5/2011 | Zhang |
| 2010/0116380 | A1 | 5/2010 | Seidel |
| 2010/0212856 | A1 | 8/2010 | Rosenthal |
| 2012/0160377 | A1 | 6/2012 | Seidel |

FOREIGN PATENT DOCUMENTS

METHOD AND PLANT FOR PRODUCING A METAL STRIP

RELATED APPLICATIONS

This application is a National Stage application of International Application PCT/EP/2013/051433 filed Jan. 25, 2013 and designating the U.S.A. and which claims priority of German Application DE 2012 201 090.4 filed Jan. 25, 2012, both applications are incorporated herein by reference thereto.

BACKGROUND OF THE INVENTION

1. Field of the Invention

The invention relates to a method of producing metal strip in a plant, comprising a continuous casting plant, a first furnace adjoining in conveying direction, a second furnace adjoining the first furnace in conveying direction and a rolling mill adjoining the second furnace in conveying direction. In addition, the invention relates to a plant for producing a metal slab or a metal strip.

2. Description of the Prior Art

Plants for producing metal strips in the stated manner are known in the prior art.

It is known from EP 1 960 131 B1 to activate or deactivate a holding furnace and an induction furnace for heating slabs in dependence on a selected mode of operation, namely in one instance in continuous production of a metal strip and in one instance in discontinuous production of the strip.

EP 1 963 034 B1 provides, for heating a slab, an induction furnace, the working frequency of which is selected to be low so that the heating effect is concentrated on the slab core.

DE 10 2008 055 650 A1 describes a method for minimising the energy requirement and the $CO_2$ emission in thin slab plants, wherein use is made of computation models by which, in particular, the water quantity needed for cooling and distribution thereof in the plant as well as casting speed are determined.

The combined use of a holding furnace and an induction furnace is also known from EP 1 469 954 B2 and from U.S. Pat. No. 7,942,191 B2.

In the case of production of hot strip in a so-named CSP plant initially the thin slab is cast in a continuous casting plant, then heated in a roller hearth furnace to the desired furnace temperature and directly thereafter rolled down in the finishing train (rolling mill) to the finished strip thickness. Heat energy (for example in the form of gas) is needed for reheating the thin slab in the roller hearth furnace and current for reshaping is needed for the thickness reduction in the finishing train. The necessary furnace temperature in that case substantially depends on the final thickness and strip width to be rolled as well as on the strip material.

Strips with lower final thickness or high loading in the finishing train in that case predominantly determine the maximum furnace temperature level (for example 1,150° C.). However, these extreme strips often represent only a smaller proportion of production. Different strips are rolled within a rolling program or within a day. A number of the strips does not require the high entry temperature, i.e. these strips are overheated. Heating energy could be saved here. However, a roller hearth furnace cannot be set as desired to each strip and the finishing train entry temperatures (T-FM; defined as mean slab temperature after heating or behind the last furnace in front of the finishing train) are changed individually. Due to the inertia of the roller hearth furnace the furnace temperature accordingly remains at substantially the same high level. The typical conceptual construction of such a previously known CSP plant is evident from FIG. 1; the course of the mean temperature over the length of the plant, i.e. from the continuous casting plant to behind the finishing train, is apparent from FIG. 2.

Figures 1, 2:
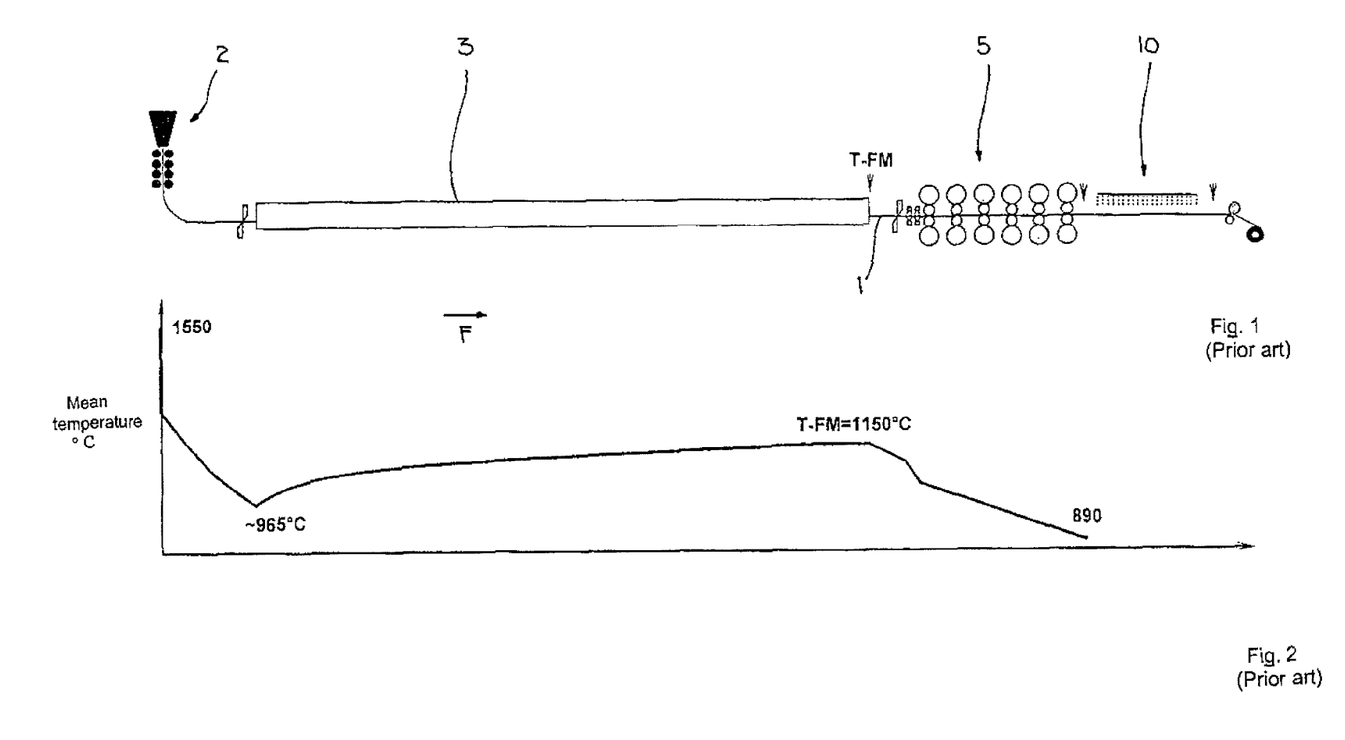
FIG. 1 schematically shows a side view of a plant for producing a metal slab or a metal strip according to the prior art, with principal components of continuous casting plant, roller hearth furnace and finishing train.
FIG. 2 shows the course of the temperature in the slab or in the strip over the course of the plant according to FIG. 1, FIG. 3 schematically shows a side view of a plant according to the invention for producing a metal slab or a metal strip.

In FIG. 1 a plant is diagrammatically depicted which comprises a continuous casting plant in which a slab 1 is cast. The slab 1 passes into a roller hearth furnace 3, where it is heated to an entry temperature $T_{FM}$. Here the slab has, for example, a thickness of 60 mm and moves in conveying direction F at a speed of 5 m/min. The roller hearth furnace is, for example, 240 m long. The slab 1 is thereafter conducted at the temperature $T_{FM}$ behind the furnace into the rolling mill 5 (finishing train) and rolled down to the strip of desired thickness, for example to a value of 2.4 mm. The strip subsequently passes onto a cooling path 10.

The corresponding course of temperature is evident from FIG. 2. It can be seen here that the entry temperature $T_{FM}$ lies at 1,150° C.

The energy expended in the roller hearth furnace and for the reshaping in the finishing train (from, for example, 60 mm slab thickness after the continuous casting plant to 2.4 mm final strip thickness) as well as the $CO_2$ emissions and energy costs can be given as follows for an example with an entry temperature $T_{FM}$ of 1,150° C. (the energy consumption of auxiliary units such as scale washing pumps, pumps for roll cooling, etc., were not taken into consideration):

The roller hearth furnace with water-cooled rollers needs a heating energy of 178.1 kWh/t. The heating costs are 5.34 Euro/t and the $CO_2$ emissions 41.0 kg of $CO_2$/t. A reshaping energy of 47.8 kWh/t with power costs of 3.35 Euro/t and a $CO_2$ emission of 26.8 kg of $CO_2$/t are needed in the finishing train for the reshaping. In total, an energy consumption of 225.9 kWh/t is incurred with costs of 8.69 Euro/t and a $CO_2$ emission of 67.7 kg of $CO_2$/t.

SUMMARY OF THE INVENTION

The invention has the object of proposing a method and an associated plant of the kind stated in the introduction by which it is possible to further reduce the energy consumption in the production of a metal strip, particularly in hot strip production in a casting/rolling plant (CSP plant), and thus not only save costs, but also reduce $CO_2$ output.

Fulfillment of this object by the invention is characterised, in terms of method, by the method comprising the steps of:
a) establishing a scope of production, which is to be effected, of metal slabs or metal strips during a defined production time period, comprising at least two different metal slabs or metal strips;
b) determining the respective entry temperatures into the rolling mill for at least a part—preferably all—metal slabs or metal strips, which are to be produced, of the defined production time period;
c) determining an exit temperature from the first furnace, wherein this is selected to be smaller than the highest entry temperature, which is determined in step b), into the rolling mill and selected to be smaller than or substantially the same as the lowest entry temperature, which is determined in step b), into the rolling mill;
d) operating the first furnace in such a manner that the metal slabs or metal strips to be produced leave the first furnace with the exit temperature determined in accordance with step c); and
e) heating or reheating a metal slab, which is to be produced, or a metal strip, which is to be produced, by means of the second furnace to its requisite entry temperature into the rolling mill insofar as this temperature lies above the exit temperature, which was determined in accordance with step (d), of the first furnace.

In the above step c) the exit temperature from the first furnace can be selected to be of substantially the same size as the lowest entry temperature, which is determined in step b), into the rolling mill. By substantially the same size there is in that case to be understood that merely slight temperature changes (cooling) behind the first furnace, i.e. in the region of the second furnace in the deactivated state thereof, are to be taken into account.

The said step c) thus determines the exit temperature from the first furnace in such a manner that the maximum entry temperature into the rolling mill is set by the second furnace with consideration of the maximum furnace power of the second furnace (the second furnace thus in any case at maximum possible furnace power starting from the exit temperature of the first furnace has to be able to reach the maximum entry temperature into the rolling mill).

The said step b) and c) can also be iteratively optimised, for which purpose they can take place in reverse sequence.

Provision can be made to use a roller hearth furnace as first furnace and/or to use an induction furnace or a DFI furnace (Direct Flame Impingement furnace) or a combination of induction furnace and DFI furnace, i.e. a furnace group, as the second furnace.

The first furnace can in that case be operated so that the exit temperature of the metal slab or of the metal strip is at most 1,125° C. Energy-saving dry furnace rollers are preferably used in the first furnace.

The second furnace (or furnace group) is preferably operated so that the temperature increase of the metal slab or the metal strip is at most 100° C. A short reheating path (induction heating path) of less than approximately 10 m can thereby achieved.

The first furnace can be used as a slab storage furnace.

The attainable temperature gradient of the first furnace is preferably smaller than the attainable temperature gradient of the second furnace, i.e. the second furnace (or furnace group) is distinguished by a high heating speed or a high temperature dynamic by which a slab can be individually heated on a relatively short path.

The exit temperatures from the first furnace and the entry temperatures into the rolling mill are, according to a development, iteratively established in such a manner that the energy costs and/or $CO_2$ emissions and/or energy consumptions for the production of hot strips are in total minimal for the first furnace and second furnace and the rolling mill in the defined production time period.

The determination of the entry temperatures in the rolling mill according to the above step b) and/or the determination of the exit temperatures from the first furnace according to the above step c) and/or the energy consumption and/or the $CO_2$ emissions and/or the energy costs for all metal slabs or metal strips to be produced can be carried out by means of a computation model.

In this regard, it can be particularly provided that minimisation of the entry temperature into the rolling mill is used as part target magnitude in the computation for minimisation of energy costs and/or $CO_2$ emissions and/or energy consumptions. The minimum furnace exit temperature of the first furnace can also be used for that purpose. Moreover, minimisation of the temperature rise in the second furnace can also be used.

In the computation model the process and plant limits are in that case preferably appropriately taken into consideration in the fixing of the optimum exit temperatures from the first furnace and entry temperatures into the rolling mill.

A DFI furnace (Direct Flame Impingement furnace) can also be used as first furnace.

In addition, use can be made—as first furnace and/or second furnace—of a DFI furnace (Direct Flame Impingement furnace), the burners of which and/or burner settings and/or flame spacing from the slab surface is or are so selected that melting of the scale or of the slab material at the slab surface does not occur. In addition, as first furnace and/or second furnace use can be made of a DFI furnace, the burners of which are constructed to uniformly heat the slab over the entire width, for which purpose the burners are preferably constructed continuously over the width thereof as rectangular nozzles. Alternatively, it is possible to use as first furnace and/or as second furnace a DFI furnace, the burners of which are of multi-row construction in conveying direction, wherein the burners are arranged to be offset from row to row, whereby they in total produce a uniform heating of the metal strip over the width.

According to a development the metal slab or the metal strip is subjected to a preliminary rolling operation ahead of the first furnace.

The first furnace can be divided into two sub-furnaces, wherein the metal slab or the metal strip is then subjected to a rolling operation between the two sub-furnaces.

In the case of non-use of the second furnace or at least of individual modules of the furnace this or these can be moved out of the production line and a roller path encapsulation can be brought into its or their place.

According to the invention, the plant for producing a metal slab or a metal strip, comprising a continuous casting plant, a first furnace adjoining in conveying direction, a second furnace, which adjoins the first furnace in conveying direction, in the form of an induction furnace and a rolling mill adjoining the induction furnace in conveying direction, is characterised in that the induction furnace comprises a plurality of induction coils spaced apart in conveying direction, wherein heat insulating means are arranged in the region of the induction coils.

Heat insulating cassettes can be arranged at least in a section in front of and/or behind and/or between the induction coils.

In addition, heat insulated roller path rollers can be arranged at least in a section in front of and/or behind and/or between the induction coils.

The induction coils can be provided with at least one insulating plate or insulating mat at the side facing the metal slab or the metal strip.

The heat insulating cassettes, the heat insulated roller path rollers and/or the insulating plates can consist of ceramic-fibre material, wherein the same are preferably clad with a thin temperature-resistant sheet metal plate.

According to a development insulating hoods can be provided, wherein the induction coils and the insulating hoods are connected with movement means so that in the case of non-use of the induction coils these can be moved out of the production line and the insulating hoods can be pushed into place instead thereof.

Moreover, means can be present by which at least one insulating hood can in any case be periodically acted on by a shaking movement, wherein the shaking movement is preferably directed transversely to the conveying direction of the metal slab or the metal strip. Shaking-off of scale which has formed can thus be promoted.

The insulating hood can in that case be of funnel-shaped construction.

According to a development it is provided that the means for acting by a shaking movement are realised by the movement means for the insulating hood, wherein these are preferably constructed for an abrupt change in the movement speed. Accordingly, the transverse drive for the insulating hood is also used at the same time for shaking of the insulating hood. Also possible is movement of the insulating hood by the movement means, wherein the insulating hood is displaced on an uneven path and thus shaken.

Finally, means can also be present for preferably periodic blasting of the insulating hood. The scale can also thereby be efficiently eliminated or removed in that, for example, after each expiry of a predetermined time the lower insulating hoods are blasted by compressed air.

In order to thus be able to flexibly set the furnace temperatures directly before entry into the rolling mill a short induction heating means is additionally arranged behind the roller hearth furnace.

In the case of non-use of the (temperature-insulated) induction heating means this or these individual modules (inductors) thereof can be moved out of the production line and an optimally insulated roller path capsule can be pushed in its place. The same or separate movement means can be used for the displacement of the inductors and insulating hoods.

The invention thus leads in advantageous manner to minimisation of energy consumption and thus energy costs as well as reduction in $CO_2$ emissions through an adapted setting of the finishing train entry temperature as well as to an optimum exit temperature from the first furnace.

For performance of the method use is preferably made of a computation model for setting an optimum or minimum roller hearth furnace exit temperature and finishing train entry temperature and ultimately a minimum energy consumption or a minimum $CO_2$ emission or minimum energy costs in dependence on the boundary conditions of the heating process, the rolling process and the cooling path. In that case consideration of the process and plant limits is carried out.

The induction heating means or the DFI furnace represents a high-dynamic setting element by which a significant temperature change can be achieved from strip to strip; by contrast, the roller hearth furnace forms a low-dynamic setting element which can bring about temperature changes in certain circumstances only over a longer period of time. According to the invention the said roller hearth furnace is used in order to preferably set a minimum slab storage temperature, whereas the induction heating means or the DFI furnace sets the preferably minimum target temperature in front of the finishing train (finishing train entry temperature).

An insulated induction heating path and a DFI furnace enable a high-dynamic heating simultaneously with optimum heat insulation and thus highly efficient heating.

The optimisation algorithm for determination of the temperature of the roller hearth furnace and for use of the induction heating means for each strip and/or for a longer production period (rolling program, day, maximum period of time of change for the temperature of the roller hearth furnace) preferably manifests itself in the form of an advance computation.

A combined use of energy-saving furnace rollers (preferably dry furnace rollers, i.e. furnace rollers without internal cooling by means of a coolant) at low furnace temperature of less than 1,125° C. (in the roller hearth furnace) and inductive reheating of the slab (or of the pre-strip) to preferably minimum finishing train entry temperatures T-FM is advantageously also possible.

The use of induction heating means for reheating the strips, but in the case of non-use an encapsulation of the entire heating means or parts of the induction heating regions, is preferably carried out for reduction of temperature losses.

Instead of the first furnace, which, for example, is constructed as a roller hearth furnace, use can also be made (alternatively or partially) of a passive or active roller path encapsulation or a walking beam furnace.

The casting thickness is preferably taken into consideration as a further optimisation parameter for reducing energy consumption and energy costs.

BRIEF DESCRIPTION OF THE DRAWINGS

Embodiments of the invention are illustrated in the drawing, in which:

FIG. 4 shows the course of the temperature in the slab or in the strip over the course of the plant according to FIG. 3, wherein the temperature course is illustrated for two different slabs or strips (in one instance with a solid line and in the other instance with a dotted line), FIG. 5 schematically shows a finishing program with a number of strips, wherein the finished strip thickness is indicated for the individual strips.

DETAILED DESCRIPTION OF THE PREFERRED EMBODIMENTS

A plant for production of a metal strip 1 is, as already explained above, to be seen in the figures. The plant comprises a continuous casting plant 2 and a first furnace 3, which follows in conveying direction F, in the form of a roller hearth furnace. A second furnace 4 in the form of an induction furnace adjoins this. A rolling mill (finishing train) adjoins the second furnace in conveying direction F. A cooling path 10 is arranged behind the rolling mill 5.

In order to be able to set an overall energy-optimal temperature $T_{FM}$ individually for each strip upstream of the finishing train it is provided in accordance with the method to appropriately apportion the heating work for the thin slab. The roller hearth furnace 3 in that case heats the thin slab 1 only to the extent that this is sufficient for most strips (for example to 1,000 to 1,050° C.). Only the extreme strips, i.e. thin strips or particularly high-strength strips or strips which strongly load the finishing train, or if high end rolling temperatures are to be ensured, are inductively heated individually to a higher finishing train entry temperature T-FM. The heating thus has to take place only to such an extent that this is necessary for technical reasons relating to load or rolling.

Figures 3, 4:
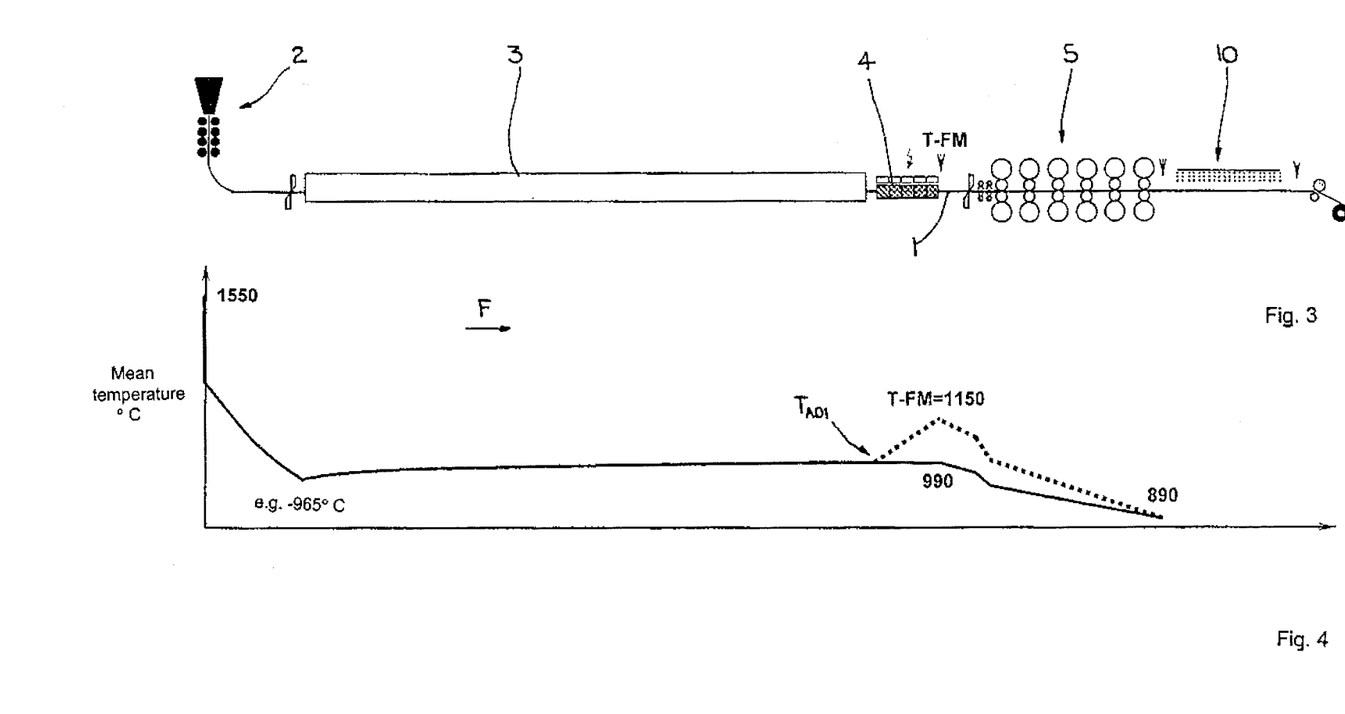

A lower temperature level leads to rise in the reshaping energy. However, the rise in the reshaping energy is substantially lower than the heat energy saved in the roller hearth furnace 3 and in a given case in the induction heating means 4. A CSP plant with a roller hearth furnace 3 and adjoining induction heating means 4 is illustrated in FIG. 3. The temperature plot according to FIG. 4 shows possible ways of proceeding particularly in the region of the induction heating means 4 and the finishing train 5. By comparison with FIG. 1 or FIG. 2 (according to the prior art) the temperature of the roller hearth furnace was reduced to, for example, 1,000° C. The finishing train entry temperature T-FM of approximately 990° C. which results therefrom is sufficient for many strips and is almost the same as the exit temperature $T_{AO1}$ from the first furnace (roller hearth furnace 3) when, for example, some heat/temperature is lost to the environment in the region of the deactivated second furnace (induction furnace 4). Since the finishing train 5 in this embodiment is operated in batch mode, rolling takes place here somewhat more rapidly.

A frequent manner of operation is indicated in FIG. 4 by a solid line and a less frequent manner of operation (with higher temperatures) is indicated by a dotted line.

The sum of the energy consumed, the energy costs and $CO_2$ emissions are correspondingly lowered. If the maximum temperature of, for example, T-FM=1,150° C. is set by inductive heating (see the dotted temperature plot in FIG. 4), there is equally a reduction in energy consumption by comparison with the state according to FIG. 1 or FIG. 2. The energy costs as well as $CO_2$ emissions rise, however, because current is expensive and is not a primary energy. However, this temperature is rarely set.

The setting of the optimum or minimum finishing train entry temperature is thus carried out for the illustrated example with the help of the induction heating means and of the roller hearth furnace. Instead of the illustrated induction heating means use can alternatively also be made of a high-power furnace such as, for example, a DFI furnace in order to achieve a similar effect.

For minimisation of energy costs and energy consumption as well as $CO_2$ emissions it is therefore the object to optimise the finishing train entry temperature T-FM within the scope of the mentioned limits and in many cases to minimise it. As setting element for the optimisation (minimisation) the exit temperature of the roller hearth furnace 3 is used as low-dynamic setting element and the induction heating means 4 is used as high-dynamic setting element, which can individually react from strip to strip or also over the strip length.

This optimisation is carried out by a computation model. The total energy costs, $CO_2$ emissions and energy consumption for each strip in a defined production time period are thereby determined. The furnace temperature $T_{AO1}$ from the first furnace as well as the finishing train entry temperature T-FM are varied in such a way that an optimum (minimum) consumption arises in iterative manner. The minimum finishing train entry temperature T-FM is preferably frequently determined for each strip. The pass plan model, the maximum permissible speeds or rotational speeds, the maximum permissible rolling forces, rolling moments and motor loads are taken into consideration for the computation and it is checked whether the strip profiles and planarities as well as the desired material characteristics (structure, breakdown of the micro-alloying elements) are in order. In addition, a cooling path model checks whether, for example, the water quantities are sufficient.

Stated in general terms, the process and plant limit values are checked and thus the minimum energy consumption or the minimum $CO_2$ emissions or the minimum energy costs are established. These calculations can be performed directly in advance ahead of each rolling process and/or in the run-up to a longer production period (for example, for a rolling program or for a day or for the maximum time period of change of the temperature of the roller hearth furnace).

As a consequence, the optimum temperatures or the gas requirement for the roller hearth furnace 3 and for the power, which is to be selected, of the induction heating means 4 depend on the intake speed, the slab thickness, the width and the material. Selection of the suitable optimum temperature of the roller hearth furnace 3 is also dependent on the furnace entry temperature and on the choice of slab thickness or the possibly present roughing stands, which similarly have to be taken into consideration and which influence the energy balance. The optimisation algorithm is linked with the casting machine model, the furnace model, the model which describes the action of the induction heating means, the pass plan model, the profile and planarity model and the cooling path model and is understood as a superordinate level 2.5 model.

In general it is to be noted that alternatively to the induction furnace 4—which is preferred—use can also be made of a DFI furnace (Direct Flame Impingement furnace—direct flame action) adapted to the slab heating, where the slab or the strip is heated by direct optimised flame action without producing melting of the slab surface. This so-called oxyfuel furnace with the DFI oxyfuel method is a special furnace in which pure oxygen, in place of air, and gaseous or liquid fuel are mixed and the flame is oriented directly in the direction of the strip or in the direction of the thin slab. This not only optimises the combustion process, but also reduces the nitrogen oxide emissions. High heat densities with good efficiency can also be achieved by this heating method.

In order to generate heating, which is as uniform as possible, over the slab width the burners of the DFI furnace are arranged to be offset from row to row in conveying direction or the burners are constructed as rectangular nozzles over the entire width.

The parameters of energy, power costs and $CO_2$ emissions for the roller hearth furnace 3, the induction heating means 4 and reshaping in the rolling train 5 and optionally 11 are ascertained and added up and the furnace temperatures and temperature increase in the induction heating means or the temperature T-FM are so set that an optimum result arises overall for the above parameters.

Figure 5:
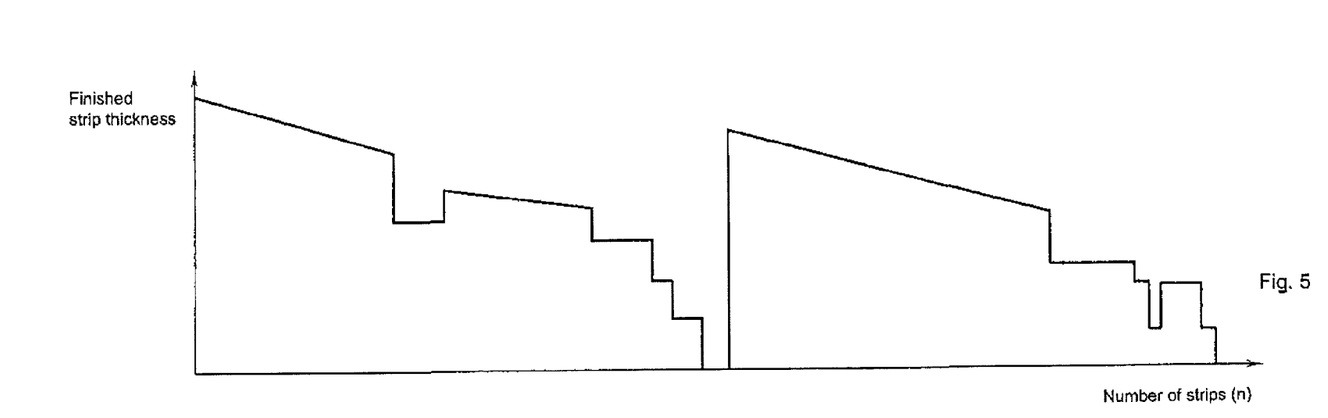
Figure 6:
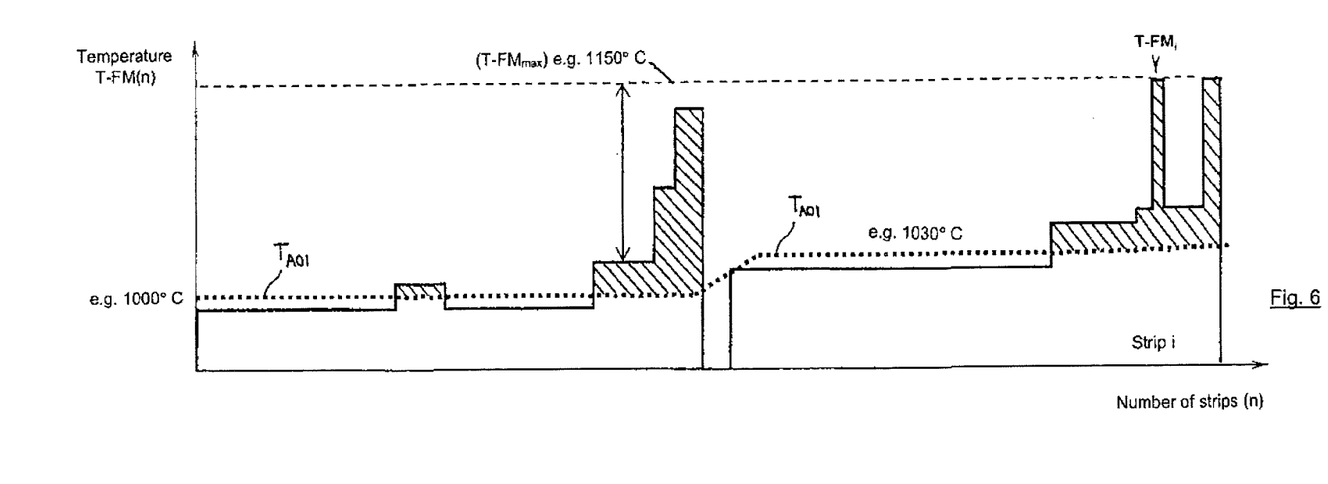
FIG. 6 shows entry temperatures $T_{FM}$, which are needed for the individual strips of FIG. 5 in the finishing train.

The example according to FIG. 5 and FIG. 6 shows how the result of the optimisation as well as the course of the temperature at the outlet of the roller hearth furnace 3 and for the finishing train entry temperature T-FM over a number of strips can appear in principle. The loading of the finishing train is expressed here, by way of example, by the strip thickness as a representative for other parameters. In the case of thicker strips the furnace temperature is not increased further and is rolled directly without activation of the induction heating means 4. The furnace temperature lies at, for example 1,000° C. If thinner slabs are in the rolling program plan in the long term, then the furnace temperature is appropriately adapted (for example to 1,030° C.); see, with respect thereto, the dotted line in FIG. 6. An inductive reheating of individual thin strips or strip groups to more than 1,000° C. to 1,150° C. (maximum required temperature) is carried out only in the case of need (see hatched region in FIG. 6). In that case, the furnace temperature $T_{AO1}$ is optimally fixed in dependence on the product mix so that a high production proportion no longer has to be inductively reheated.

It is evident from FIG. 6 that in the region between the temperature of the roller hearth furnace (here: approximately 1,000° C. or later 1,030° C.) and the maximum required temperature T-FM of here 1,150° C. (see dashed line in FIG. 6; in the case of strips which do not need higher temperatures, the induction heating means is not active) there is avoidance of overheating. The reheating takes place only for some strips by induction heating (hatched regions).

Figure 7:
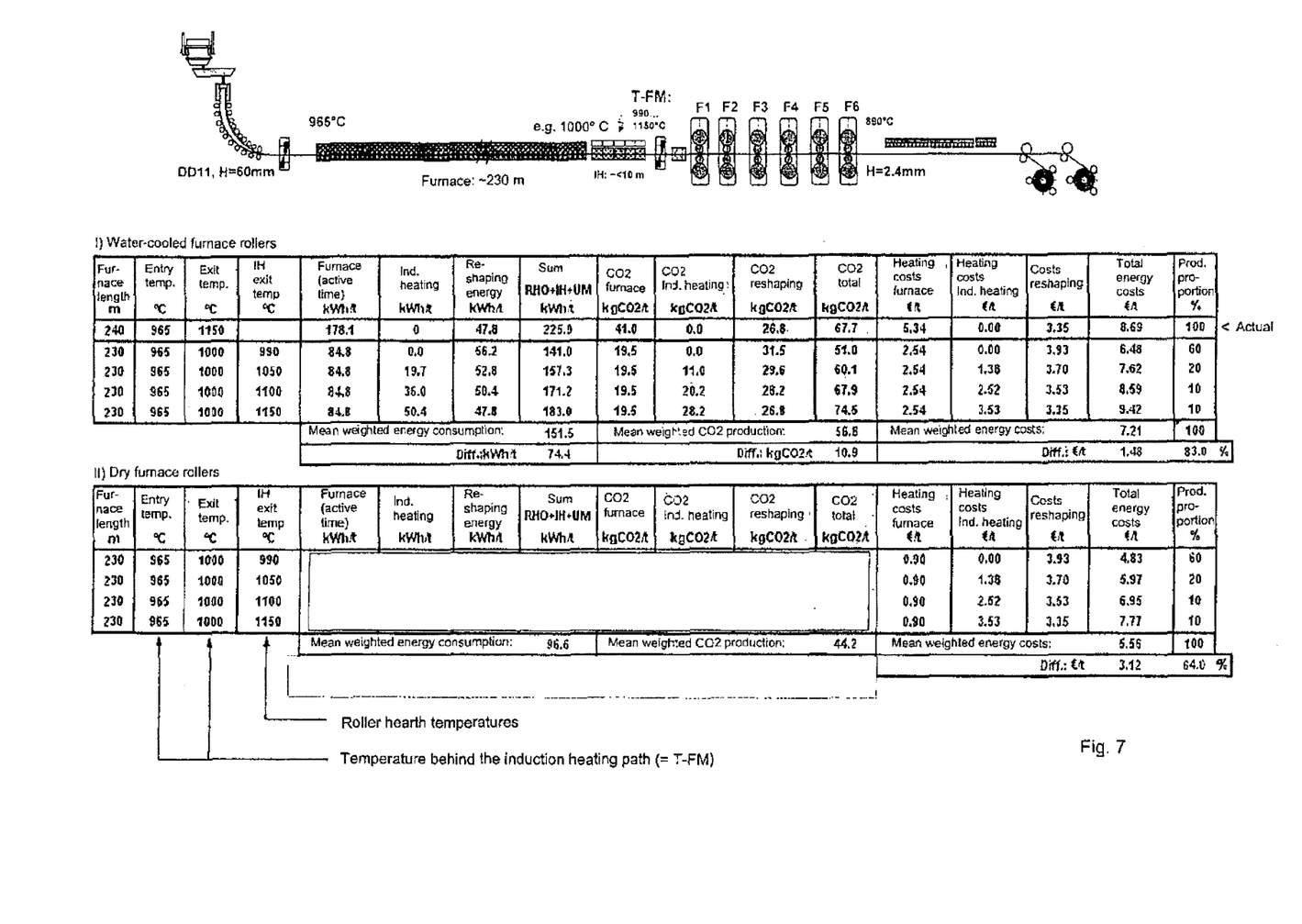
FIG. 7 shows an overview with respect to the energy costs in the case of use of the method according to the invention for an example with water-cooled furnace rollers in the roller hearth furnace and for an example with dry furnace rollers, FIG. 8 schematically shows a side view of a plant for producing a metal slab or a metal strip according to an alternative embodiment, FIG. 9 schematically shows a side view of a plant for producing a metal slab or a metal strip according to a further, alternative embodiment, FIG. 10 schematically shows a side view of a sectionally illustrated induction furnace according to the prior art, FIG. 11 schematically shows a side view of a sectionally illustrated induction furnace with a construction according to the invention, FIG. 12 schematically shows, in the illustration according to FIG. 11, the induction furnace, wherein here, however, the inductors are in part exchanged for insulating hoods.

By comparison with a CSP plant according to the prior art in accordance with FIG. 1 or FIG. 2, the effect of the changed temperature guidance is clear in FIG. 7. The energy consumption, $CO_2$ emissions and energy costs are illustrated here for different variants or for different finishing train entry temperatures T-FM. For the sake of simplification the same rolling process is assumed here (entry thickness=60 mm, exit thickness=2.4 mm), so that the temperature effect or the heating effect is clear. The production proportion of the strips with different finishing train entry temperatures T-FM is differentiated in the Table. The reference position for the temperature T-FM is given here behind the induction heating means IH. For example, 60% of the thin slabs are not heated up (T-FM=990° C.), 20% of the slabs are inductively heated from the furnace temperature 1,000° C. to 1,050° C., 10% to 1,100° C. and 10% to 1,150° C. If the sum of the proportions is formed, the overall result is obtained. A successful use of this optimisation method thus gives for the illustrated product mix a reduction of energy costs, energy consumption and $CO_2$ emissions. The energy costs reduce from, for example, 83% of the original level of the procedure according to FIG. 1, in which a constant furnace temperature of 1,150° C. is present.

The method for saving energy by temperature minimisation is preferably combined with use of energy-saving dry furnace rollers. If the roller hearth furnace 3 (or, in the case of double-strip plants, both furnaces) is generally operated at temperatures less than 1,050° C. to 1,100° C. all rollers can in advantageous manner be executed as energy-optimal dry furnace rollers. Moreover, a smaller furnace roller wear arises or simpler furnace roller materials more favourable in cost can be used.

The effect of the dry furnace rollers in the case of otherwise equal conditions is illustrated in FIG. 7 "II) dry furnace rollers". The energy consumption is thereby halved in this example and the energy costs thus further reduced to 64% of the original value.

Figure 8:
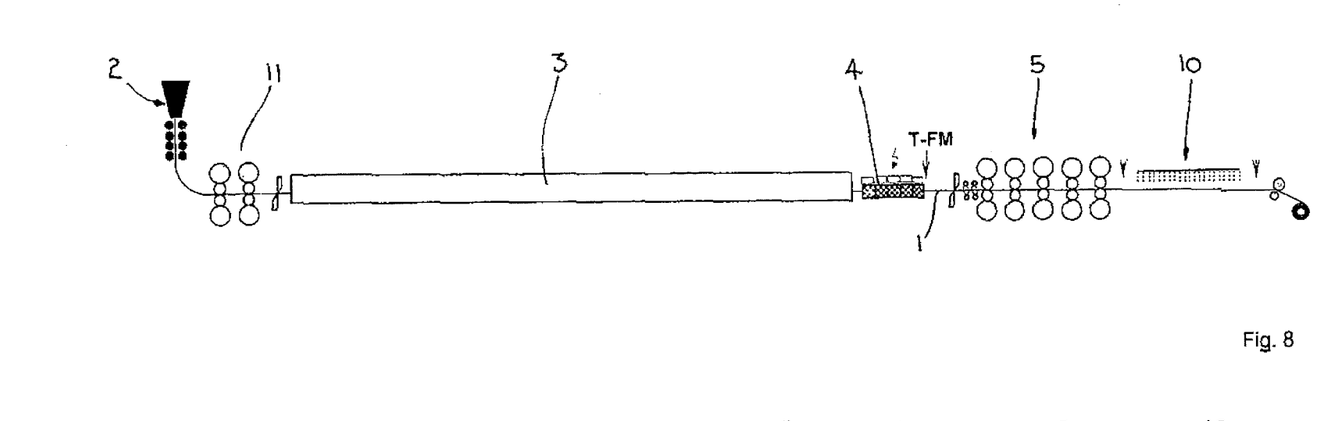
Figure 9:
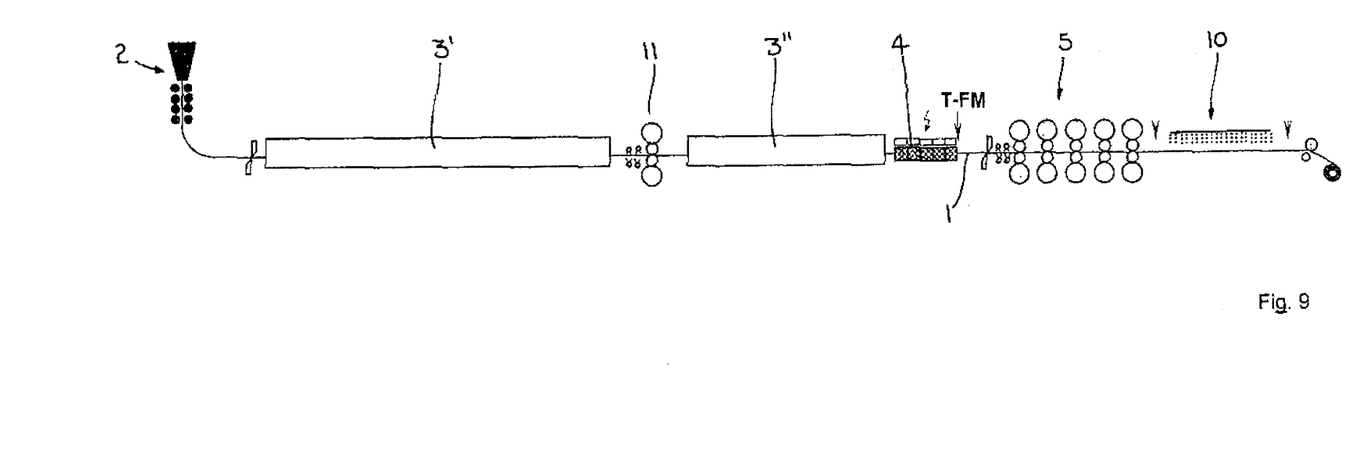

The described method for minimisation of energy consumption, $CO_2$ emissions and energy costs through setting of the optimum finishing train entry temperature T-FM can be used not only in compact CSP plants, but also in CSP plants with a roughing stand or roughing stands behind the continuous casting plant or within the roller hearth furnace. Variants of that kind are illustrated in FIGS. 8 and 9, where a roll stand 11 is used in front of the roller hearth furnace 3 (FIG. 8) or where the roller hearth furnace 3 is divided into two sub-furnaces 3' and 3", wherein a roll stand 11 is arranged between these.

Equally, use of the method in thin-strip casting-rolling plants with a similar design as well as also in conventional production plants consisting of thick-slab casting plant, thick-slab furnace, roughing stands and induction heating means behind the furnace or in front of the finishing rolling train is possible. In the case of a plant with roughing stands the roughing-stand reduction and/or roughing-stand rolling speed is or are utilised for further influencing and optimisation of the finishing train entry temperature T-FM. Instead of a roller hearth furnace 3, a passive or active roller path encapsulation can also be used alternatively or in part.

In the case of non-use of the entire induction heating means 4 or non-use of parts of the induction heating path provision is made to thermally encapsulate this region of the roller path so that the temperature losses are minimised there. For this purpose the entire induction heating path or the individual modules of the induction heating means and the roller path encapsulation are constructed to be transversely displaceable. Either the induction heating means or an optimally insulated roller path encapsulation stands in the transport line to the rolling train. Alternatively or additionally, the induction heating means can also be constructed with integrated insulation.

Figure 10:
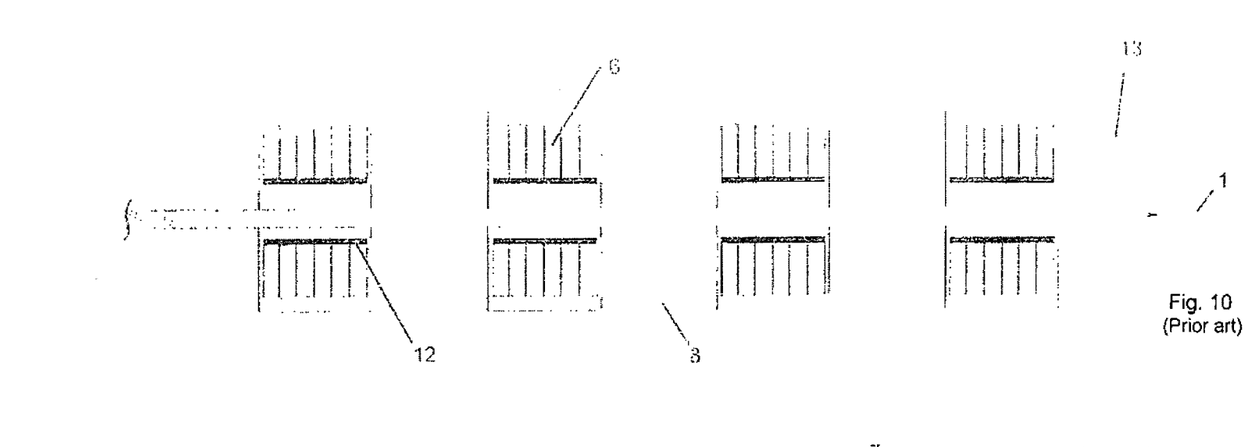

The induction heating means 4 is an element by which a large amount of energy can be supplied to a thin slab on a relatively short path. However, during inductive heating the thin slab at the same time radiates energy to the environment, roller path rollers and cooled induction heating means cladding. Due to these losses the effective efficiency of the inductive heating means 4 is reduced. FIG. 10 (prior art) shows the current construction of an induction heating means path. Induction coils 6 with a plate 12 for coil covering can be recognised. The inductor cladding is cooled so that the induction coil does not overheat. Also to be seen are roller path rollers 8 and drive rollers 13.

Figure 11:
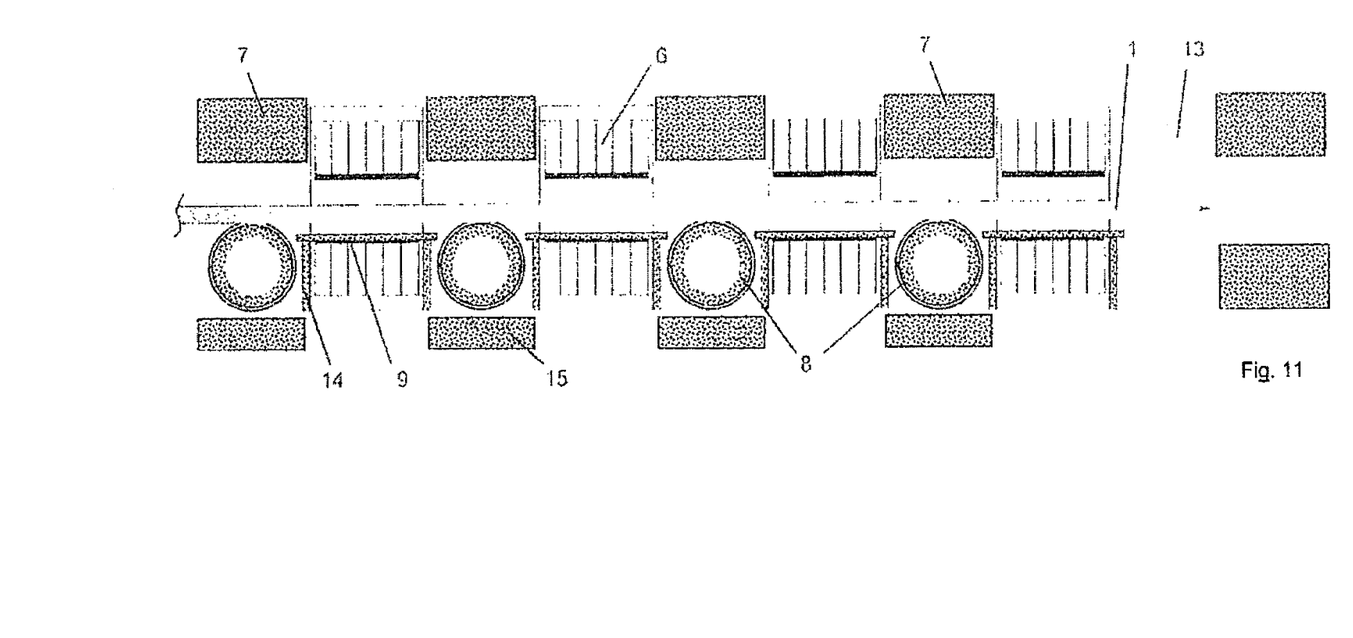

In order to increase the effective efficiency or to reduce the temperature losses in the region of the induction heating means it is proposed to at the same time arrange heat insulation within the induction heating path, as FIG. 11 shows. Provided as insulating equipment are heat insulating cassettes 7 at the top between the inductors, heat insulated roller path rollers 8 (disc rollers with insulation therebetween) and thin heat insulating plates or mats 9 in front of the inductors 6 (can be arranged at the bottom and top).

The insulating material preferably consists of temperature-resistant ceramic material with low heat conductivity, density and specific heat. The insulating cassettes can also be clad with thin, temperature-resistant sheet metal plate.

The heat insulating cassettes 7 between the inductors 6 can optionally be constructed to be adjustable in height or able to be moved out in order, for example, to counteract asymmetrical heating of the thin slab 1 and/or possible slab curvature.

An insulation 14 is also provided between the roller 8 and the induction coil 7.

In order to reduce temperature losses of the roller 8 in downward direction an insulation 15 can also be provided below the roller.

Figure 12:
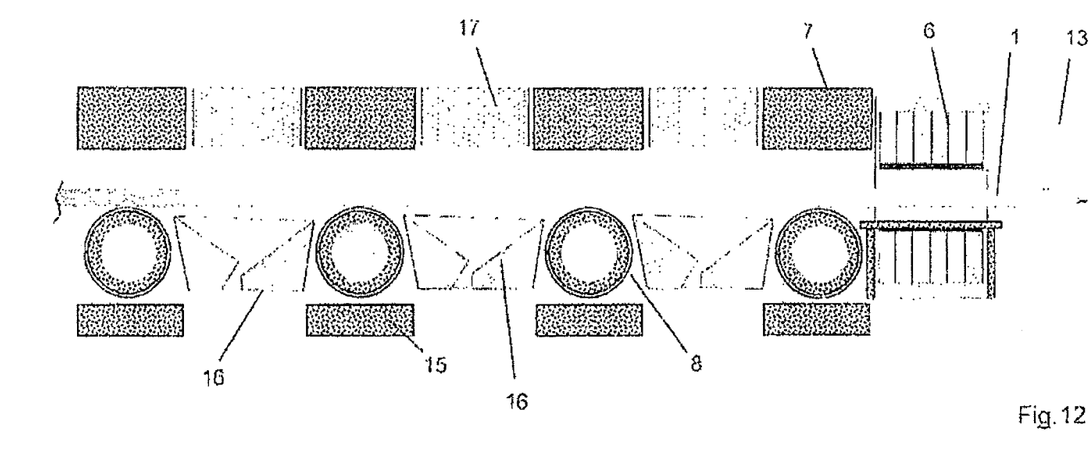

In the case of non-use of the induction coil 6 these regions can be exchanged for insulating hoods 16, 17 by, for example, lateral displacement, as shown by FIG. 12. The funnel-shaped insulating hoods 16 arranged on the lower side can be additionally seen here. Shaking-off of the scale is thereby promoted and collection of scale on the lower insulating hoods thus avoided. Through periodic shaking of the lower insulating hoods 16 transversely to the transport direction of the slab 1 the shaking-off of scale which arises is additionally improved. This shaking process can take place by the transverse movement drive—which is present in any case—of the insulating hood, by changing the speed of the drive or preferably by a movement on an uneven transport path when the transverse transport is used. Alternatively, the scale can be blown off downwardly from time to time by means of blasting equipment. As measures for elimination of scale and thus avoidance of deposits movable insulating units as well as stationary insulating hoods can be put into practice in similar manner on the lower side.

In addition to insulation within the induction heating means, insulation between the roller hearth furnace and the induction heating means as well as behind the induction heating path is provided. Cooling of the surface is thereby advantageously reduced and the effect of induction heating assisted.

Since the induction heating means with integrated insulation is relatively effectively encapsulated, this equipment can also optionally be operated under a protective gas atmosphere (nitrogen, argon, furnace flue gases) in order to avoid scale formation thereat.

Figure 14:
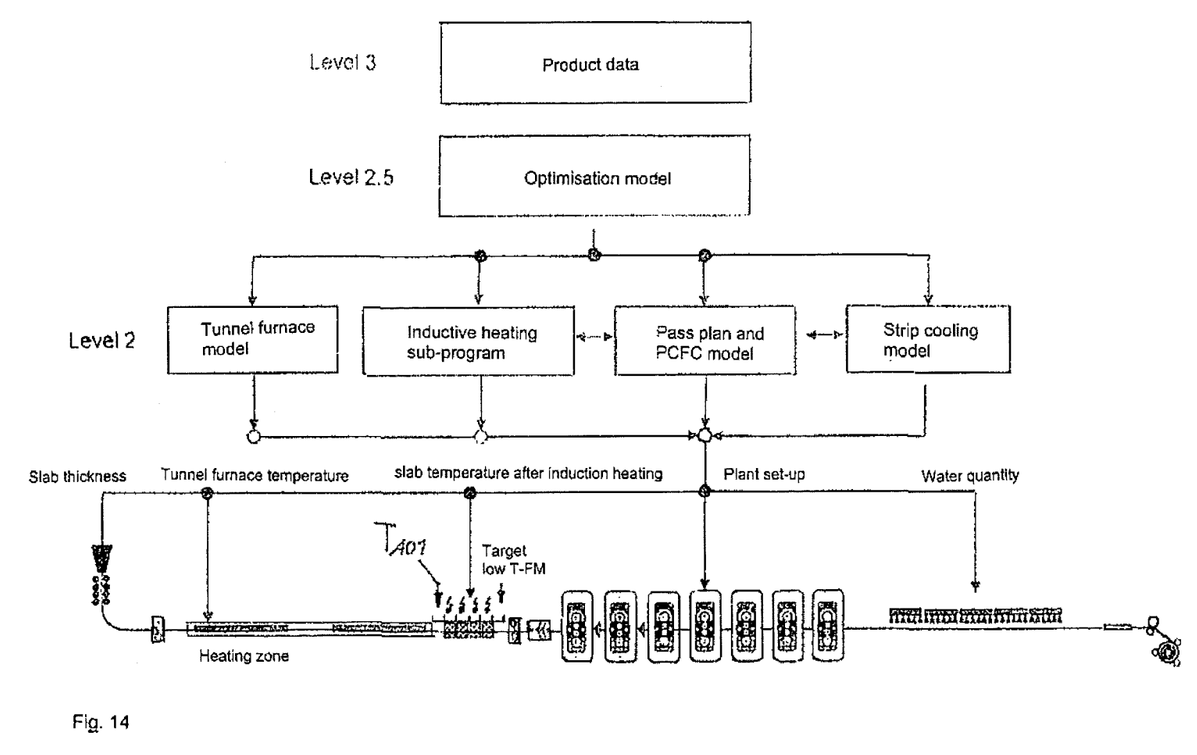

The components of the optimisation model or the interrelationship of the different sub-models for establishing the roller hearth furnace exit temperature $T_{AO1}$ and the finishing train entry temperature T-FM are illustrated in FIG. 14. This model or this method takes place on-line, i.e. use during the ongoing production process, and/or alternatively off-line for preparatory study purposes and advantageously for optimum rolling program planning. Strip groups of similar loading or characteristics can thereby be suitably combined with the object of creating passes of the same minimum furnace temperature $T_{AO1}$ or finishing train entry temperature T-FM so as to further minimise energy consumption.

Figure 15:
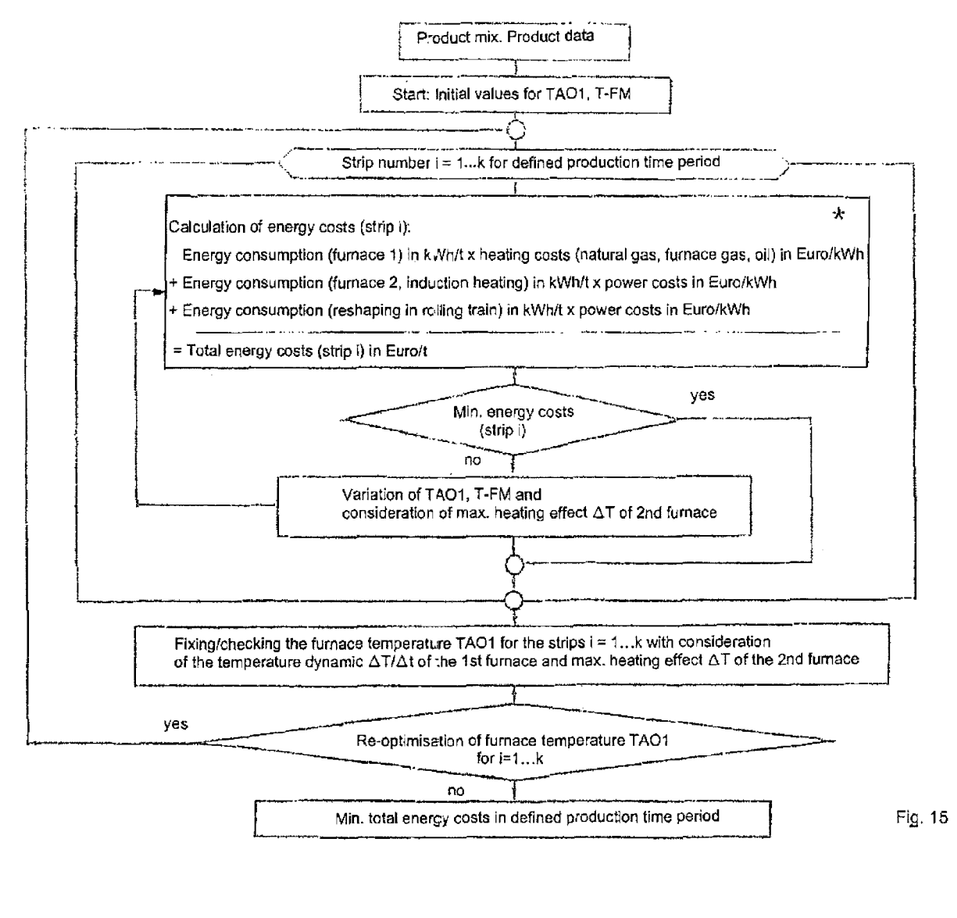

The sequence of optimisation steps for minimisation of, for example, energy costs is illustrated in FIG. 15. The main optimisation parameters are in that case roller hearth furnace exit temperature $T_{AO1}$ as well as finishing train entry temperature T-FM. The above parameters are calculated for the strips K of a defined production time period and the temperatures $T_{AO1}$ and T-FM are so iteratively varied or set that overall minimum energy costs result arise.

Analogously to the procedure for minimisation of total energy costs the $CO_2$ emissions or energy consumption can optionally also be minimised. It is merely necessary for that purpose to exchange the corresponding parameters in the box in FIG. 15 which is marked with a star (*).

Figure 13:
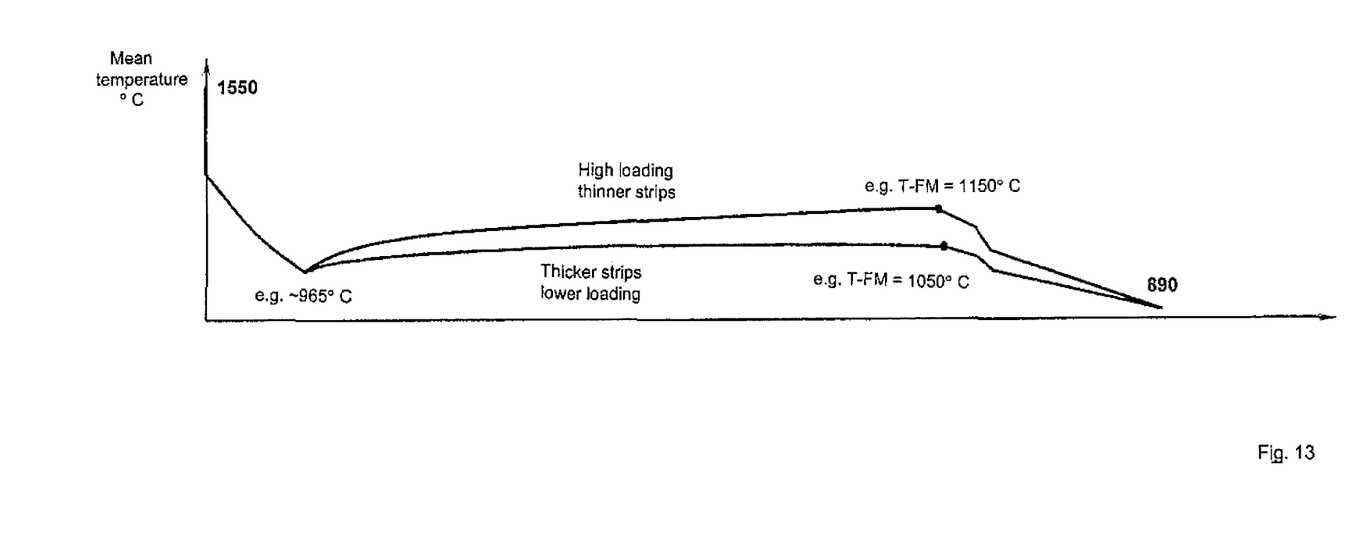
FIG. 13 shows the course of the temperature in the slab or in the strip over the course of the plant according to an alternative mode of operation, FIG. 14 schematically shows the computation model for operation of the plant optimally in terms of energy and FIG. 15 schematically shows a flow chart of the optimisation model.

The proposed procedure for minimisation of energy consumption, $CO_2$ emission and energy costs can also be realised without a second furnace or second furnace group (for example without induction heating means 4) behind the roller hearth furnace 3. In that case, the roller hearth furnace 3 is set to a minimum finishing train entry temperature T-FM in dependence on the finishing train conditions (finished strip thickness, loading, finished strip temperature, necessary water quantity in the cooling path, etc.). This is not then carried out individually for each thin slab, but is taken into consideration in the run-up to the rolling program format and a minimum finishing train entry temperature T-FM is selected with consideration of the oven heating dynamic for the product critical in the time period; see FIG. 13. The optimisation algorithm is for that purpose the same, but without energy considerations at the second furnace. However, efficiency is lower due to the lower oven heating dynamic (in the first furnace).

The above-illustrated computation result with respect to the setting of the optimum roller hearth temperature and the inductive reheating and thus the dividing-up of the heating with fuel (natural gas, furnace gas, oil) or electrically can be different from country to country, since the costs for fuel and power significantly vary. The previously illustrated cases are according to be understood only as an example.

As boundary condition for the exemplifying calculation the following parameters were taken into consideration in the embodiment: gas price: 0.030 Euro/kWh; price of power: 0.070 Euro/kWh; $CO_2$ emissions, gas: 0.230 kg of $CO_2$/kWh; $CO_2$ emissions, power: 0.560 kg of $CO_2$/kWh (power mix in Germany).

REFERENCE NUMERAL LIST 1 metal slab/pre-strip/metal strip
2 continuous casting plant
3 first furnace (roller hearth furnace)
3' sub-furnace
3" sub-furnace
4 second furnace (induction furnace)
5 rolling mill (finishing train)
6 induction coil
7 heat insulating cassette
8 roller path roller
9 insulating plate
10 cooling path
11 roll stand(s)
12 plate
13 drive roller
14 insulation
15 insulation
16 insulation
$T_{FM}$=T-FM entry temperature into the rolling mill (behind the last furnace upstream of the finishing train)
$T_{AO1}$ exit temperature from the first furnace
$\Delta T$ temperature change
$\Delta T/\Delta t$ temperature gradient (temperature change per unit of time)
F conveying direction

The invention claimed is:
1. Method of producing metal slabs or metal strips (1) in a plant, comprising a continuous casting plant (2), a first furnace (3) adjoining in conveying direction (F), a second furnace (4) adjoining the first furnace (3) in conveying direction (F), wherein an attainable temperature gradient ($\Delta T/\Delta t$) of the first furnace (3) is smaller than an attainable temperature gradient ($\Delta T/\Delta t$) of the second furnace (4),
characterised in that
the method comprises the steps of:
a) establishing a scope of production, which is to be effected, of the metal slabs or the metal strips (1) during a defined production time period, comprising at least two different metal slabs or metal strips (1);
b) determining a respective entry temperatures ($T_{FM}$) into a rolling mill (5) for at least a part of the metal slabs or the metal strips (1), which are to be produced, in a defined production time period;
c) determining an exit temperature ($T_{AO1}$) from the first furnace (3), wherein this is selected to be smaller than a highest entry temperature ($T_{FM}$), which is determined in step b), into the rolling mill (5) and selected to be smaller than or substantially the same as a lowest entry temperature ($T_{FM}$), which is determined in step b), into the rolling mill (5);
d) operating the first furnace (3) in such a manner that the metal slabs or the metal strips (1) to be produced leave the first furnace (3) with the exit temperature ($T_{AO1}$) determined in accordance with step c); and e) heating or reheating the metal slab, which is to be produced, or the metal strip (1), which is to be produced, by means of the second furnace (4) to its requisite entry temperature ($T_{FM}$) into the rolling mill (5) insofar as this temperature lies above the exit temperature ($T_{AO1}$), which was determined in accordance with step (d), of the first furnace (3), wherein the first furnace is operated so that the exit temperature ($T_{AO1}$) of the metal slab or the metal strip (1) is at most 1,125° C.

2. Method according to claim 1, characterised that in step c) according to claim 1 the exit temperature ($T_{AO1}$) from the first furnace (3) is selected to be substantially the same as the lowest entry temperature ($T_{FM}$), which is determined in step b) according to claim 1, into the rolling mill (5).

3. Method according to claim 1, characterised in that at least one of a roller hearth furnace is used as the first furnace (3) and an induction furnace or a DFI furnace (Direct Flame Impingement furnace) or a combination of induction furnace and DFI furnace is used as the second furnace (4).

4. Method according to claim 1, characterised in that the second furnace (4) is operated so that temperature increase of the metal slab or the metal strip (1) is at most 100° C.

5. Method according to claim 1, characterised in that the first furnace (3) is used as a slab storage furnace.

6. Method according to claim 1, characterised in that the exit temperature ($T_{AO1}$) from the first furnace (3) and the entry temperatures ($T_{FM}$) into the rolling mill (5) are iteratively determined in such a manner that at least one of energy costs and $CO_2$ emissions and energy consumptions for production of hot strips are in total at a minimum in the defined production time period for the first furnace (3) and the second furnace (3) and the rolling mill (5).

7. Method according to claim 1, characterised in that the determination of at least one of the entry temperatures ($T_{FM}$) into the rolling mill (5) according to step b) of claim 1, and the determination of the exit temperature ($T_{AO1}$) from the first furnace (3) according to step c) of claim 1, and energy consumption, and $CO_2$ emissions, and energy costs for all the metal slabs or the metal strips (1) to be produced is carried out by means of a computation model.

8. Method according to claim 7, characterised in that minimisation of the entry temperature ($T_{FM}$) into the rolling mill (5) is used as a part of target magnitude in the calculation for at least one of minimisation of the energy consumption, the $CO_2$ emissions, and the energy costs.

9. Method according to claim 7, characterised in that minimum furnace outlet temperature ($T_{AO1}$) of the first furnace (3) is used as a part of target magnitude in the calculation for at least one of minimisation of the energy consumption, the $CO_2$ emissions, and the energy costs.

10. Method according to claim 7, characterised in that minimisation of the temperature rise ($\Delta T$) in the second furnace (4) is used as a part of target magnitude in the calculation for at least one of minimisation of the energy consumption, the $CO_2$ emissions, and the energy costs.

11. Method according to claim 7, characterised in that process and plant limits are taken into consideration in the computation model for determination of optimum exit temperature ($T_{AO1}$) from the first furnace (3) and entry temperatures ($T_{FM}$) into the rolling mill (5).

12. Method according to claim 1, characterised in that a DFI furnace (Direct Flame Impingement furnace) is used as the first furnace (3).

13. Method according to claim 1, characterised in that a DFI furnace (Direct Flame Impingement furnace), at least one of burners of which, and burner settings, and flame spacing from the slab surface is so selected that melting of scale or of a slab material at the slab surface does not occur, is used as at least one of the first furnace (3) and the second furnace (4).

14. Method according to claim 1, characterised in that a DFI furnace (Direct Flame Impingement furnace), burners of which are constructed to uniformly heat the slab over an entire width, for which purpose the burners are constructed continuously over a width thereof as rectangular nozzles, is used as at least one of the first furnace and the second furnace.

15. Method according to claim 1, characterised in that a DFI furnace (Direct Flame Impingement furnace), burners of which are of multi-row construction in conveying direction (F), wherein the burners are arranged to be offset from row to row, whereby in sum over the width they produce uniform heating of the metal strip (1), is used at least as one of the first surface or the second surface.

16. Method according to claim 1, characterised in that the metal slab or the metal strip (1) is subjected to a pre-rolling operation upstream of the first furnace (3).

17. Method according claim 1, characterised in that the first furnace (3) is divided into two sub-furnaces (3', 3") and that the metal slab or the metal strip (1) is subjected to a rolling operation between the two sub-furnaces (3', 3").

* * * * *